United States Patent [19]
Gaffal

[11] 4,146,238
[45] Mar. 27, 1979

[54] HYDROSTATIC SHAFT SEAL

[75] Inventor: Karl Gaffal, Hessheim, Fed. Rep. of Germany

[73] Assignee: Klein, Schanzlin & Becker Aktiengesellschaft, Frankenthal, Fed. Rep. of Germany

[21] Appl. No.: 754,684

[22] Filed: Dec. 27, 1976

[30] Foreign Application Priority Data

Jan. 8, 1976 [DE] Fed. Rep. of Germany ....... 2600505

[51] Int. Cl.² ............................................. F16J 15/40
[52] U.S. Cl. .................................. 277/15; 277/81 R; 277/96.1
[58] Field of Search ................... 277/15, 22, 81 R, 96, 277/96.1, 83, 86, 13, 3

[56] References Cited

U.S. PATENT DOCUMENTS

| | | | |
|---|---|---|---|
| 3,127,181 | 3/1964 | Greco | 277/13 |
| 3,499,653 | 3/1970 | Gardner | 277/83 |
| 3,617,068 | 11/1971 | Sprenger | 277/83 |
| 3,843,140 | 10/1974 | Mayer et al. | 277/15 |
| 3,968,969 | 7/1976 | Mayer et al. | 277/15 |
| 3,968,969 | 7/1976 | Mayer et al. | 277/15 |

*Primary Examiner*—Robert I. Smith
*Attorney, Agent, or Firm*—Peter K. Kontler

[57] ABSTRACT

A hydrostatic seal for the upright shaft of a coolant circulating pump in a nuclear reactor plant has a first sealing element which is affixed to the shaft and a second sealing element which is axially movably mounted in the pump housing and defines with the first sealing element an annular control clearance gap wherein leak fluid flows from a high-pressure compartment which surrounds the sealing elements to a low-pressure compartment between the shaft and the housing. An auxiliary pump causes the fluid to circulate in response to rotation of the shaft along an endless path which is defined by the high-pressure compartment, an annular space a portion of which is adjacent to that end face of the second sealing element which is remote from the gap, a flow restrictor between the high-pressure compartment and the space, one or more passages which are machined into the housing, and a chamber which communicates with the high-pressure compartment by way of the auxiliary pump. The passage or passages can deliver fluid to a conditioning chamber wherein the fluid is cooled to prevent undue thermally induced deformation of the sealing elements. The pressure differential which is established by the flow restrictor insures that the pressure in the outer region of the gap invariably exceeds the pressure at the aforementioned end face of the second sealing element whenever the pump shaft rotates to thus prevent frictional contact between those surfaces of the sealing elements which flank the gap.

10 Claims, 3 Drawing Figures

LEAK FLUID

WITH AUXILIARY PUMP

WITHOUT AUXILIARY PUMP

WIDTH OF GAP 4

PRESSURE DIFFERENTIAL BETWEEN 5 AND 6

HYDROSTATIC SHAFT SEAL

BACKGROUND OF THE INVENTION

The present invention relates to shaft seals, and more particularly to hydraulic machines which embody hydrostatic shaft seals of the type wherein leak fluid can escape from the high-pressure side to the low-pressure side of the seal by way of a control clearance gap. Such seals are often utilized in coolant circulating pumps of nuclear reactor plants.

Heretofore known hydrostatic shaft seals function satisfactorily during normal operation of a pump or other machine which embodies the seal. However, when a pump which circulates coolant in a nuclear reactor plant is started, the temperature and/or pressure of conveyed fluid often varies at an unpredictable rate and is likely to adversely affect the action of hydrostatic seal. The reasons for such improper functioning of a hydrostatic seal during starting are as follows: In order to furnish a satisfactory sealing action, a hydrostatic shaft seal must maintain the stationary sealing ring which is mounted in the pump housing out of contact with the rotary sealing ring which shares the angular movement of the shaft and defines with the stationary ring a control clearance gap of desired width. The two rings will not contact each other if the difference between the pressure in the low-pressure compartment (which receives leak fluid by way of the gap) and the pressure in the high-pressure compartment (upstream of the gap) does not decrease below a predetermined minimum value. If the rings are permitted to contact each other, the surfaces which flank the gap undergo pronounced wear and the width of the gap increases when the pressure differential increases to the desired value. When the pump or the plant is started, the pressure differential is often so low that the rings come into actual contact with each other (at least one of the gap-defining rings in a hydrostatic shaft seal is movable axially toward and away from the other ring) and are subjected to extensive wear as a result of frictional engagement between the surfaces which flank the gap. Moreover, malfunctioning of one or more units in the plant often entails pronounced fluctuations of the temperature of conveyed fluid whereby the fluid causes thermally induced deformation of sealing rings with the result that the width of the control clearance gap deviates from an optimum width or from a range of acceptable widths.

SUMMARY OF THE INVENTION

An object of the invention is to provide a hydraulic machine, particularly an upright liquid coolant circulating pump for use in a nuclear reactor plant, with a novel and improved hydrostatic shaft seal which is effective not only when the plant and/or the machine operates properly but especially when the machine is started and/or during the intervals of malfunctioning of the plant.

Another object of the invention is to provide a pump or another hydraulic machine with novel and improved means for preventing closing of the control clearance gap for leak fluid in the hydrostatic shaft seal whenever the pump shaft is in motion.

A further object of the invention is to provide means for preventing or reducing the likelihood of thermally induced deformation of sealing elements in a hydrostatic shaft seal.

An additional object of the invention is to provide a pump or another hydraulic machine which embodies a hydrostatic shaft seal with novel and improved means for preventing closing of the control clearance gap in the hydrostatic seal irrespective of fluctuations in system pressure and/or the temperature of the fluid, as long as the rotary sealing element of the hydrostatic seal remains in motion.

An ancillary object of the invention is to provide novel and improved means for preventing wear upon and/or distortion of sealing elements in a hydrostatic shaft seal.

The invention is embodied in a hydraulic machine, particularly in an upright pump for circulation of fluid coolant in a nuclear reactor plant. The machine comprises a rotary member (e.g., a pump shaft), a housing which surrounds the rotary member and defines therewith a fluid-filled high-pressure compartment and a low-pressure compartment, a first annular sealing element which surrounds the rotary member and is rotatable therewith, a second annular sealing element which is mounted in the housing, which surrounds the rotary member and which defines with the first sealing element an annular control clearance gap for the flow of leak fluid from the high-pressure compartment into the low-pressure compartment (one of the sealing elements is movable axially of the rotary member toward and away from the other sealing element), and novel and improved means for circulating fluid through the high-pressure compartment in response to rotation of the rotary member. The circulating means comprises an annular space which is defined by the housing and the one sealing element and a portion of which is adjacent to that end face of the one sealing element which is remote from the gap, a flow restrictor which connects the high-pressure compartment and the space and insures that the pressure of fluid in the space is less than in the high-pressure compartment, and means (e.g., an auxiliary pump) for conveying fluid from the space into the high-pressure compartment in response to rotation of the rotary member. The conveying means preferably further comprises at least one passage defined by the housing and having an intake end in communication with the space and a discharge end in communication with the high-pressure compartment. Still further, the circulating means may comprise a chamber defined by the rotary member and/or housing and receiving fluid from the passage or passages of the circulating means; the auxiliary pump may be arranged to draw fluid from the chamber and to admit the thus withdrawn fluid into the high-pressure compartment.

The machine may further comprise means for cooling or conditioning the circulated fluid; such means may include a conditioning chamber which receives fluid from a first portion of the passage or passages and from which conditioned fluid is evacuated by way of a second portion of the passage or passages. Alternatively, the cooling means may include a heat exchanger and/or the aforediscussed conditioning chamber.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
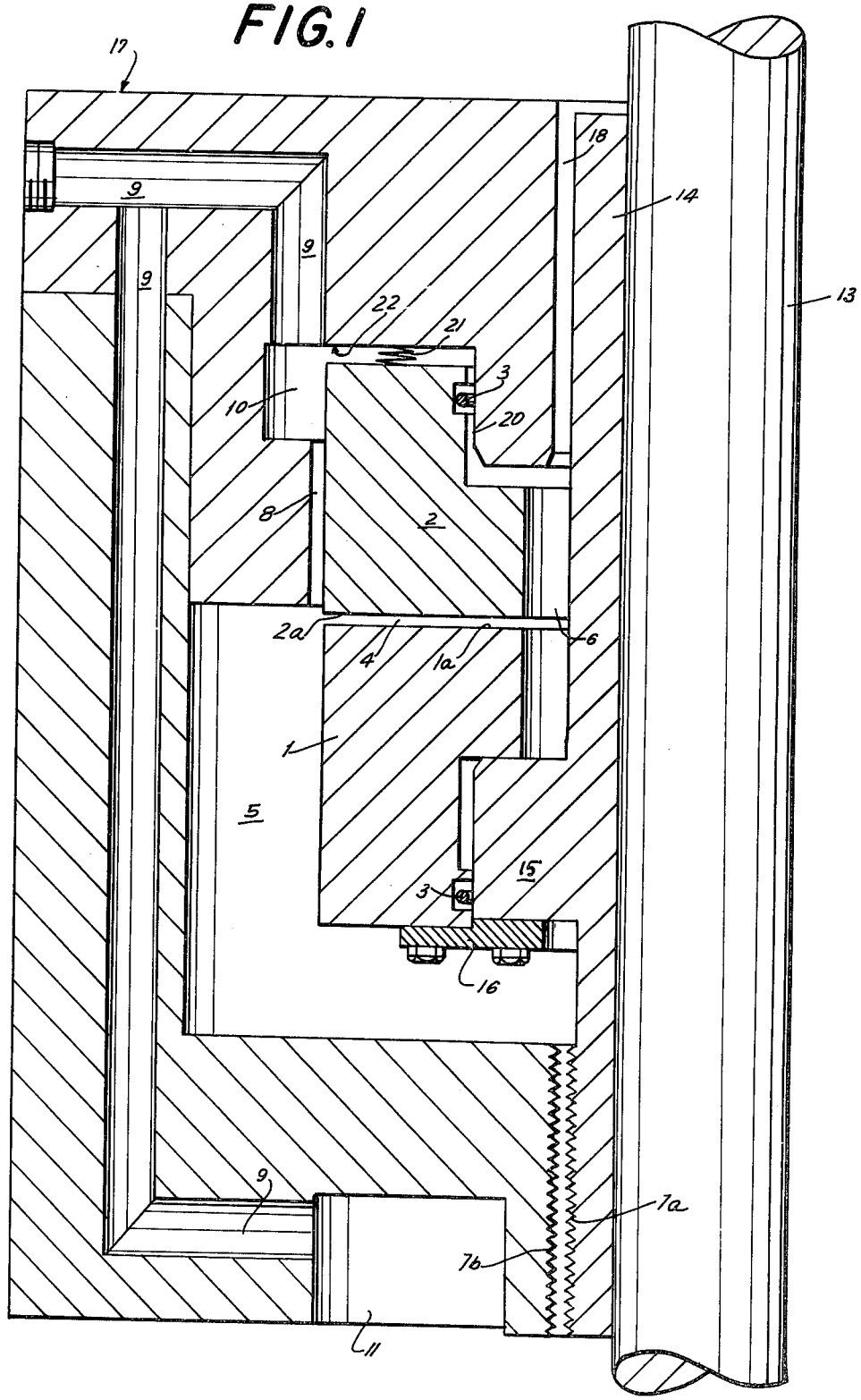
FIG. 1 is a fragmentary axial sectional view of an upright pump which embodies one form of the invention.

Referring to FIG. 1, there is shown a portion of an upright coolant circulating pump which is assumed to be installed in a nuclear reactor plant. The pump comprises an upright shaft 13 surrounded by a sleeve 14 which can be considered an integral part of and rotates with the shaft 13 to transmit torque to a ring-shaped sealing element 1. The latter is secured to a collar 15 of the sleeve 14 by a ring 16. An O-ring 3 or an analogous secondary sealing element is interposed between the peripheral surface of the collar 15 and the internal surface of the sealing element 1.

The housing 17 of the pump contains a ring-shaped sealing element 2 which is adjacent the sealing element 1 and defines therewith a circumferentially complete annular control clearance gap 4 through which leak fluid flows from a high-pressure compartment 5 to a low-pressure compartment 6. Such leak fluid issues from the housing 17 by flowing through an annular clearance 18 between the housing and the peripheral surface of the sleeve 14. An O-ring 3 or an analogous secondary sealing element is installed between an internal surface 20 of the housing 17 and the internal surface of the sealing element 2. One or more springs 21 may be provided to bias the sealing element 2 toward the sealing element 1; such springs react against a shoulder 22 of the housing 17 and bear against the adjacent end face of the sealing element 2. The pressure which the fluid exerts against the peripheral surface of the sealing element 1 is constant; this surface is surrounded by the high-pressure compartment 5. Pressurized fluid whose leakage must be controlled is admitted into the compartment 5 and a portion of such fluid passes through the gap 4 into the low-pressure compartment 6 whence the leak fluid flows into and through the clearance 18.

In accordance with a feature of the invention, the pump comprises fluid circulating means including an auxiliary fluid conveying device or pump which causes the fluid to flow into the high-pressure compartment 5. Such device serves to cause the fluid to circulate in a circuit a portion of which includes the compartment 5. In the embodiment of FIG. 1, the fluid conveying device includes an externally threaded portion 7a of the sleeve 14 and an internally threaded portion 7b of the housing 17. The portion 7b surrounds and is spaced apart from the portion 7a to define with the latter an annular channel wherein the fluid is compelled to flow from a chamber 11 into the compartment 5 when the shaft 13 is driven by the pump motor, not shown. As a rule, the output element of the motor is separably coupled to the pump shaft 13, for example, in a manner as disclosed in the commonly owned copending application Ser. No. 723,712 of Dernedde. If desired, a portion of the sealing element 1 may constitute a component part of the auxiliary fluid conveying device.

The aforementioned circuit further includes an elongated channel or passage 9 which returns fluid from the compartment 5 into the chamber 11 and is machined into the housing 17. The intake end of the passage 9 receives fluid from the compartment 5 by way of an annular space 10 and a flow restrictor 8, both surrounding the non-rotatable sealing element 2. The housing 17 may be provided with two or more passages 9 which are spaced apart from each other, as considered in the circumferential direction of the sealing elements 1 and 2. The main supply of fluid in the pump is confined in a chamber (not shown) which communicates with or includes the chamber 11, or which communicates with or includes the space 10.

Figure 2:
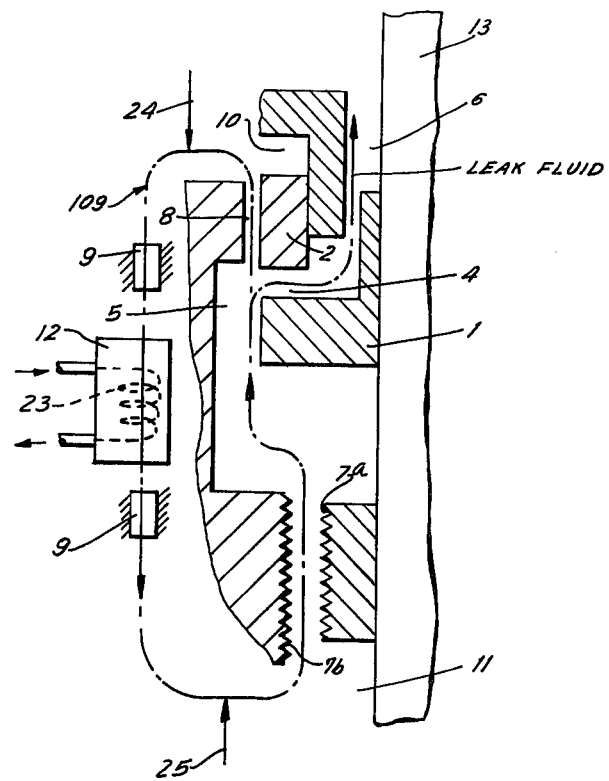
FIG. 2 is a smaller-scale schematic fragmentary axial sectional view of a modified pump.

FIG. 2 shows schematically a portion of a slightly modified pump wherein the aforementioned circuit (indicated by the phantom line 109) further includes a conditioning chamber 12 through which the fluid passes on its way from the space 10 into the chamber 11 and which contains a heat exchanger 23 serving to insure that the temperature of fluid which flows from the conditioning chamber 12 into the chamber 11 is always within an acceptable range, even if the temperature of fluid which enters the space 10 (see the arrow 24) from the main supply or which enters the chamber 11 from the main supply (see the arrow 25) fluctuates within a wide range or deviates (normally exceeds) considerably from the acceptable temperature range. The conditioning chamber 12 constitutes an optional but highly desirable feature of the pump. In the absence of the chamber 12, the passage or passages 9 provide a shortest path for the flow of fluid from the space 10 into the chamber 11.

The operation:

During normal operation of the pump, the width of the gap 4 is constant or nearly constant, and such width depends on several factors including the pressure of fluid at the upstream side (radially outermost region) of the gap 4, the pressure of fluid in the space between the shoulder 22 of the housing 17 and the adjacent end face of the sealing element 2, and the bias of the spring or springs 21. The sealing element 2 (i.e., that sealing element which is mounted in the housing 17 and does not rotate with the sealing element 1) can be disposed at a level above or below the rotating sealing element 1.

When the pump is started or when the system pressure is low, the sealing element 2 tends to move downwardly under the action of gravity, under the bias of the spring or springs 21 and in response to the pressure of fluid against the upper end face of the sealing element 2 to thereby reduce the width of a portion of or the entire gap 4 to zero so that the surfaces 1a, 2a of the sealing elements 1, 2 move into frictional engagement with each other to cause a pronounced wear upon such sealing elements. If the element 2 is mounted at a level below the element 1 and the system pressure is too low, the element 2 tends to rise and to bear against the rotating element 1 in response to fluid pressure in the space below its lower end face and in response to the bias of the spring or springs 21. The same situation (actual contact between the surfaces 1a and 2a which flank the gap 4) can develop if the system pressure decreases in normal operation of the pump, e.g., due to malfunctioning of one or more units in the nuclear reactor plant.

The just discussed frictional engagement between the sealing elements 1 and 2 is prevented, even in the event of unexpected or undesired drop in system pressure, by the provision of circulating means including the auxiliary fluid conveying device 7a, 7b and the aforementioned circuit comprising the parts 8–11 or 8–12. Thus, when the shaft 13 rotates with the sleeve 14 and sealing element 1, the device 7a, 7b causes a stream of fluid to flow from the chamber 11, through the compartment 5, flow restrictor 8, space 10, passage or passages 9 and back into the chamber 11. In the event that the upstream portion(s) of the passage or passages 9 feed fluid to and the downstream portion(s) of the passage or passages 9 receive fluid from the conditioning chamber 12, the heat exchanger 23 insures that the temperature of fluid leaving the chamber 12 matches or deviates only slightly from a desired optimum temperature which does not cause thermally induced deformation of the sealing element 1 and/or 2. The flow restrictor 8 establishes and maintains a pressure differential between the compartment 5 and space 10, i.e., the pressure of fluid in the space 10 is less than in the compartment 5. The space 10 communicates with or includes the space between the shoulder 22 and the upper end face of the sealing element 2 so that the pressure in the gap 4 (which communicates with the compartment 5) exceeds the pressure of fluid in the space above the upper end face of the axially movable sealing element 2. In fact, the space 10 can be said to extend all the way to the O-ring 3 between the sealing element 2 and the internal surface 20 of the housing 17.

The pressure of fluid in the low-pressure compartment 6 is considerably less than in the compartment 5 because the gap 4 also acts not unlike a flow restrictor by throttling the flow of leak fluid from the radially outermost region thereof toward the sleeve 14 on the shaft 13. The pressure differential between the compartment 5 and space 10 is desirable and advantageous because it insures that the pressure of fluid in the outer region of the gap 4 is sufficiently high to prevent frictional contact between the surfaces 1a and 2a; this will be readily understood since the pressure in the space 10 and hence the pressure acting upon the upper end face of the axially movable sealing element 2 is relatively low so that such pressure, even though assisted by the bias of the spring or springs 21, cannot reduce the width of the gap 4 to zero. The just discussed pressure differential is not overly affected by the system pressure so that, if properly selected, it invariably prevents any contact between the surfaces 1a, 2a during starting of the pump as well as when the system pressure drops below normal pressure owing to malfunctioning of one or more units in the nuclear reactor plant and/or for other unexpected reason or reasons. It has been found that the pressure differential between the compartment 5 and the space 10 remains substantially constant within the entire range of system pressures. The extent of such pressure differential can be readily selected by appropriate dimensioning and/or adjustment of the auxiliary fluid conveying device 7a, 7b and/or by appropriate selection of the flow restrictor 8. Once properly selected or adjusted, the pressure differential between the compartment 5 and space 10 need not be changed again, i.e., it is not necessary to monitor the pressure differential once the pump is assembled.

Figure 3:
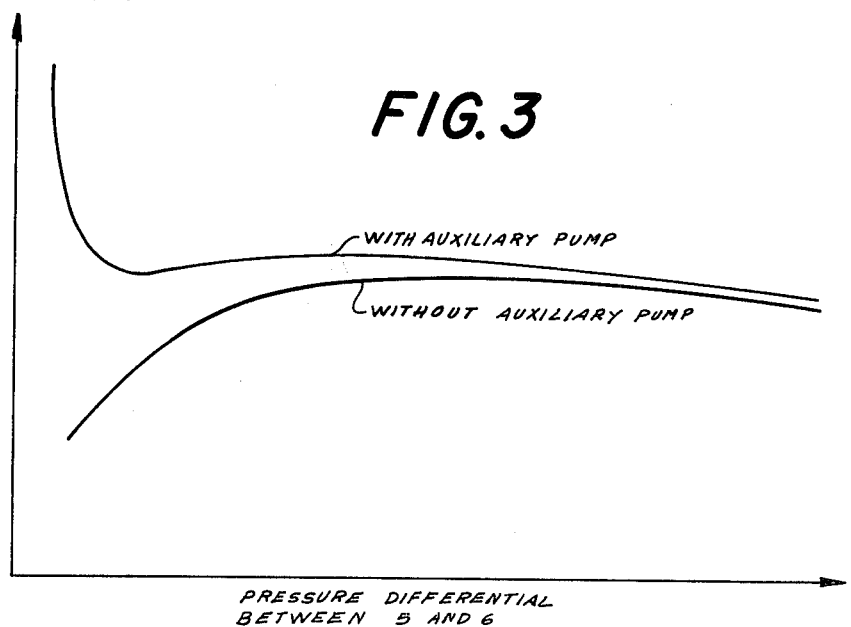
FIG. 3 is a diagram showing variations in the width of the control clearance gap with and without the improved fluid circulating means.

In a hydrostatic shaft seal, the tendency of leak fluid which flows from the high-pressure compartment 5 into the low-pressure compartment 6 to widen the gap 4 increases with increasing system pressure and decreases with decreasing system pressure. The pressure differential between the compartment 5 and the space 10 is felt less when the system pressure is relatively high but its influence on the pressure of fluid which enters the gap 4 and on the pressure of fluid which exerts a force against the upper end face of the axially movable sealing element 2 is quite pronounced when the system pressure is low. This is desirable and advantageous for obvious reasons. The differences between variations in the width of the gap 4 in the presence and absence of the auxiliary conveying device (i.e., in the presence or absence of pressure differential between the compartment 5 and space 10 due to the circulation of fluid along the path defined by the parts 8–11 or 8–12) is shown in the diagram of FIG. 3.

As mentioned above, the conditioning chamber 12 with the heat exchanger 23 compensates for eventual fluctuations in temperature of the circulating fluid. The pressure of fluid in the chamber 12 is the same as in the passage or passages 9, and the supply of fluid in the chamber 12 constitutes a buffer against undue fluctuations of the temperature of fluid which contacts the sealing element 1 and/or 2 to thus prevent or reduce the likelihood of thermally induced deformation of the element 1 and/or 2 with attendant change in the width of the gap 4. The conditioning chamber 12 can be disposed in any other portion of the circuit which includes the passage or passages 9 (e.g., adjacent the sealing element 1 and/or 2), as long as it can prevent undue changes of fluid temperature in the region adjacent the sealing elements 1 and 2. The chamber 12 is especially effective in reducing the undesirable effects of those temperature changes which are caused by the plant because the rate of fluid circulation along the path defined by the parts 8–12 is much higher than the rate of leak fluid flow through the gap 4.

The illustrated threaded fluid conveying device 7a, 7b constitutes but one of several devices which can be used to induce the fluid to flow from the high-pressure compartment 5, through the flow restrictor 8 and space 10, and back to the high-pressure compartment as soon as the shaft 13 begins to rotate. For example, such device may include an impeller on the shaft 13. It is further clear that the improved seal may constitute one of a series of two or more hydrostatic seals; e.g., the clearance 18 can discharge leak fluid into the high-pressure compartment of a second hydrostatic seal.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In a hydraulic machine, particularly in an upright pump for circulation of fluid coolant in a nuclear reactor plant, a combination comprising a rotary member; a housing surrounding said rotary member and defining therewith a fluid-filled high-pressure compartment and a second compartment; a first annular sealing element surrounding and rotatable with said member; a second annular sealing element mounted in said housing, surrounding said member and defining with said first element an annular control clearance gap for the flow of leak fluid from said high-pressure compartment to said second compartment, one of said elements being movable axially of said member and having an end face remote from said gap; the surface forming the end face being at the opposite end in an axial direction from the surface of the one element acting with the other element in forming the gap; cooperating passage means and conveying means for circulating fluid through said high-pressure compartment in response to rotation of said member, said passage means including an annular space defined by said housing and said one sealing element and having a portion adjacent said end face, a flow restrictor defined by said housing and said one element and establishing a path for the flow of fluid from said high-pressure compartment into said space whereby the pressure of fluid in said high-pressure compartment and in a portion of said gap including at least a portion of the gap forming surface of said one element exceeds the pressure of fluid in said portion of said space including at least a portion of the end face forming surface of said one element to thus prevent said one element from moving axially into contact with the other of said element, and said conveying means conveying fluid from said high-pressure compartment, through said flow restrictor and through said space in response to rotation of said member.

2. A combination as defined in claim 1, wherein said conveying means further comprises at least one passage provided in said housing and having an intake end communicating with said space and a discharge end in communication with said high-pressure compartment.

3. A combination as defined in claim 2, wherein said fluid circulating means further comprises a chamber defined by said housing intermediate the discharge end of said passage and said high-pressure compartment.

4. A combination as defined in claim 3, wherein said fluid conveying means draws fluid from said chamber and admits the thus withdrawn fluid into said high-pressure compartment.

5. A combination as defined in claim 1, wherein said circulating means further comprises a fluid conditioning chamber including means for maintaining the temperature of fluid flowing to said high-pressure compartment within a predetermined range so as to prevent the fluid from appreciably changing the temperature of said sealing elements.

6. A combination as defined in claim 5, wherein said circulating means further comprises a passage defined by said housing and having a first portion connecting said space with said chamber and a second portion for conveying fluid from said chamber toward said high-pressure compartment.

7. A combination as defined in claim 1, further comprising means for cooling the fluid which is circulated by said conveying means.

8. A combination as defined in claim 7, wherein said cooling means includes a chamber forming part of said circulating means.

9. A combination as defined in claim 1, further comprising a first secondary sealing element interposed between said first sealing element and said member and a second secondary sealing element interposed between said second sealing element and said housing, one of said secondary sealing elements bounding a portion of said space.

10. A combination as defined in claim 1, wherein one of said sealing elements is disposed at a level above the other of said sealing elements.

* * * * *